United States Patent [19]

Regan

[11] Patent Number: 4,810,139
[45] Date of Patent: Mar. 7, 1989

[54] QUICK-CHANGE OVER-SPINDLE ADAPTER

[75] Inventor: Donald J. Regan, Farmington Hills, Mich.

[73] Assignee: NO-MA Engineering Incorporated, Farmington Hills, Mich.

[21] Appl. No.: 91,476

[22] Filed: Aug. 31, 1987

Related U.S. Application Data

[63] Continuation-in-part of Ser. No. 936,052, Nov. 28, 1986, Pat. No. 4,722,645.

[51] Int. Cl.⁴ .............................................. B23B 31/10
[52] U.S. Cl. ............................... 408/239 A; 279/1 A; 279/91; 279/101; 403/342; 409/234
[58] Field of Search ............... 279/1 A, 1 B, 7, 91, 279/97–101, 1 R, 89, 90, 8; 408/239 R, 239 A; 409/232, 234; 403/342, 343

[56] References Cited

U.S. PATENT DOCUMENTS

| | | | |
|---|---|---|---|
| 2,709,600 | 5/1955 | Lehde | 279/52 |
| 2,717,791 | 9/1955 | Packer | 287/62 |
| 3,887,203 | 6/1975 | Benjamin et al. | 279/1 B X |
| 4,171,821 | 10/1979 | Miller | 279/1 B X |

FOREIGN PATENT DOCUMENTS 102404 8/1941 Sweden .
128003 6/1919 United Kingdom .
833802 4/1960 United Kingdom ................ 403/342

Primary Examiner—Joseph H. McGlynn
Assistant Examiner—Steven C. Bishop
Attorney, Agent, or Firm—Neal A. Waldrop; Jay C. Taylor

[57] ABSTRACT

An over-spindle quick-change assembly for releasably securing a tool holding adapter at an operative position with respect to a power rotatable shank spindle comprises a cylindrical sleeve sleeved over the tool holding end of the spindle. A collar rotatable on the sleeve has a threaded portion engageable with a nut on the adapter for screwing the nut and adapter to the operative position, whereat confronting annular surfaces of the nut and spindle end engage each other in sealing relationship. The sleeve is prevented from relative movement on the spindle by a set screw screwed radially into the spindle shank and having a reduced diameter extension confined within a radial hole in the sleeve. The threaded portion of the set screw is dimensioned to prevent its entry into the radial sleeve hole. The collar is retained against axial movement relative to the sleeve by a ring resiliently expandable and contractible radially and having inner and outer circumferential portions confined within confronting grooves in the sleeve and collar respectively.

20 Claims, 2 Drawing Sheets

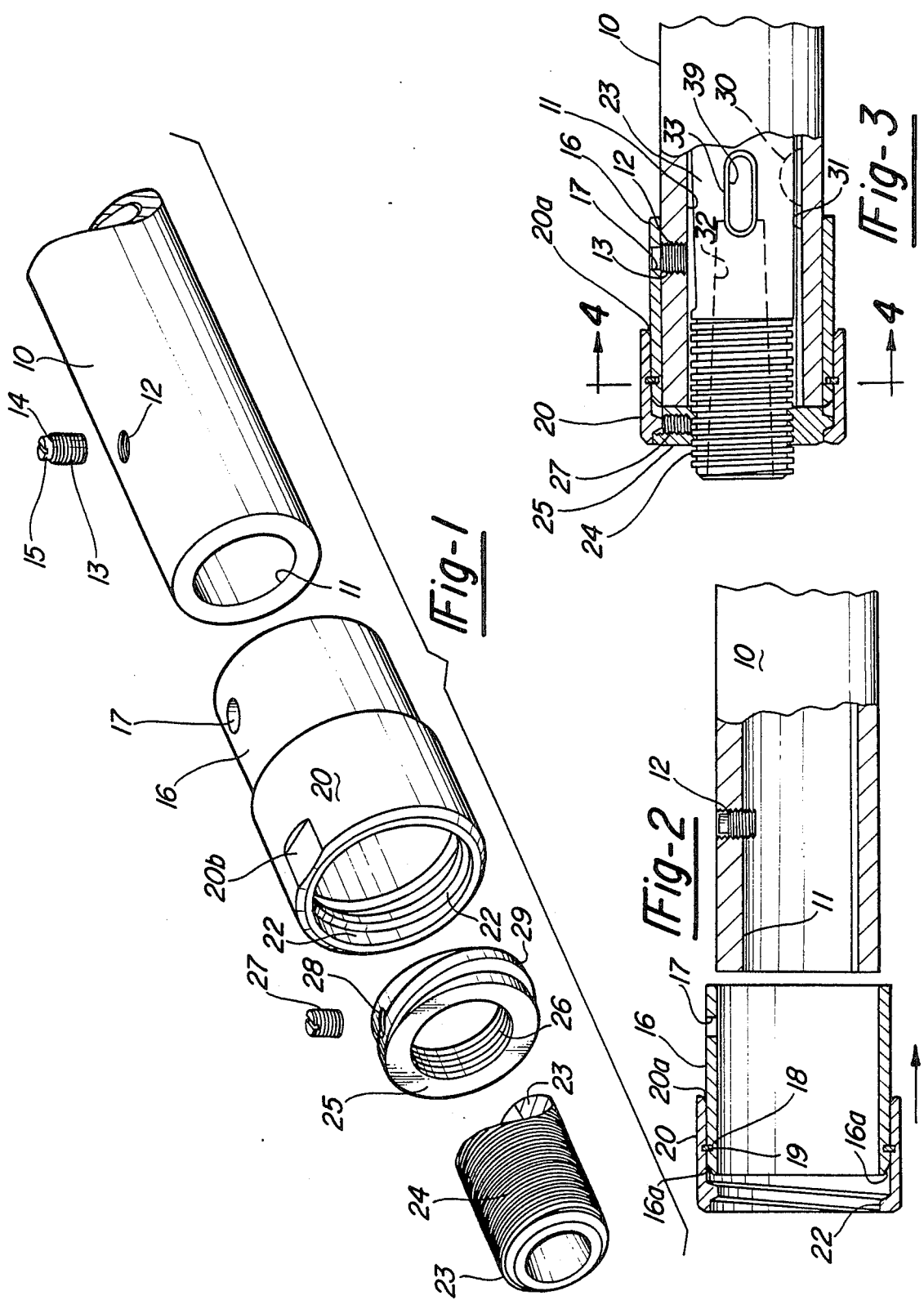

QUICK-CHANGE OVER-SPINDLE ADAPTER

This application is a continuation-in-part of my copending application Ser. No. 936,052, filed Nov. 28, 1986, now U.S. Pat. No. 4,722,645. The invention in the parent application concerned modifications of a standard automotive shank spindle to provide a novel quick-change system for releasably attaching a tool holding adapter to the modified spindle, whereas the present invention involves the provision of an improved adapter for such a spindle that enables the aforesaid quick-change releasable attachment without necessitating a modification of the spindle.

BACKGROUND AND OBJECTS OF THE INVENTION

A common machine tool arrangement employed in the mass production of various articles wherein drilling, boring, reaming, grinding, and similar operations involve a rotating tool comprises a tool holding adapter removably attachable to a power driven spindle.

Heretofore, latch mechanisms for releasably securing the tool holding adapter and spindle in operative engagement with each other have employed attachments or spindle adapters that fit over the tool holding end of the spindle and are accessible from that end to enable changing of the tool holding adapter. The concept of such spindle adapters, known generally as over-spindle adapters, has long been approved, especially with multiple spindle machines, because it is usually cumbersome and time consuming to reach into a fairly closely spaced assembly of such spindles to unscrew set screws or operate other mechanisms as required for releasing and replacing the tool holding adapter. By virtue of the over-spindle type of adapter, a tool change can be readily made by accessing a releasable attachment for the adapter at the exposed end of the spindle.

Although the desirability of such over-spindle adapters has long been recognized, the spindle adapters available heretofore leave much to be desired. In particular, a common type of over-spindle adapter employs an axially slidable cam sleeve around the tool holding end of the spindle and maintained in a retracted tool holding position by spring means. The sleeve is provided with an annular cam that holds an annular arrangement of balls within an annular retaining groove in the tool holding adapter, such that the latter cannot be removed from the spindle. Upon axial movement of the sleeve from the retracted position, the cam releases the balls from the retaining groove to enable removal of the tool holding adapter from the spindle.

Such spindle adapters are not only complicated to use and expensive to manufacture, but are also subject to jamming when small chips or fines from prolonged grinding or drilling operations enter the latch mechanism and prevent release of the balls, whereupon the tool holding adapter often must be pried or pounded off the spindle. In consequence an advertised five second tool change might require half an hour or more.

Important objects of the present invention are to provide an improved over-spindle adapter of comparatively simple and economical construction for releasably securing a tool holding adapter to a power driven standard automotive shank spindle; wherein the tool holding adapter can be quickly attached in an operative position to the spindle, or quickly released, usually by finger manipulation; wherein the latch mechanism of the spindle adapter for attaching and releasing the tool holding adapter relative to the spindle is at all times shielded from particles of dirt, grindings, chips and fines resulting from machining operations; wherein a positive rotary drive mechanism between the spindle and tool holding adapter is completely independent of the latch mechanism; and wherein the present invention is especially suitable for use with multiple spindle machines or in small diameter machining applications.

Another object of the invention is to provide such a spindle adapter that is readily coupled with a standard automotive shank spindle without requiring any modification of the spindle. The spindle adapter comprises a sleeve extending around and keyed to the tool holding end of the spindle by means of a special set screw that replaces the set screw conventionally used to secure the tool holding adapter within the spindle. A retention and rejection collar rotatable coaxially but not movable axially on the sleeve is provided with an internally threaded portion in screw threaded engagement with external threads of an annular nut that also has internal threads screwed on external threads of the tool holding adapter to a desired position of adjustment, whereby upon rotation of the collar in one direction or the other, the adapter is moved axially into or out of an operative position within the conventional coaxial endwise opening recess in the spindle.

A conventional spline engagement between the spindle and tool holding adapter at the operative position provides a positive drive (independent of the latch mechanism) for rotating the adapter upon rotation of the spindle. Also the threaded connection between the collar and the nut on the tool holding adapter is arranged so that rotation of the collar in the direction for moving the adapter to the operative position is opposite the rotational direction of the spindle during its power operation.

The above mentioned annular nut screwed on the tool holding adapter replaces the nut that is conventionally used and adjusted axially on the adapter to determine the axial position of the tool held by the adapter. The annular nut provided by my invention also abuts the spindle end tightly in annular sealing engagement around the endwise opening into the spindle recess when at said operative position. In accordance with the present invention, the annular nut is conventionally adjusted axially along the adaptor and then secured at its adjusted position by a set screw that screws radially into the annular nut and tightly against the adapter. At the tightened position of the set screw, its radially outer end is recessed below the external threads of the nut so as not to interfere with the aforesaid threaded engagement between the internally threaded collar and externally threaded nut. By reason of the latter engagement, the nut, secured at its adjusted position on the tool holding adapter, is drawn tightly into said annular sealing engagement with the spindle to prevent entry of grinding fines into the endwise opening spindle recess simultaneously with locating the tool holding adapter at its operative position.

Other and more specific objects are to provide the threaded connection between the collar and tool holding adapter with an acme type thread dimensioned to move the adapter from its operative position within the spindle to a position out of engagement with the collar upon approximately a single full turn of the collar; and to provide effective means for retaining the collar against axial movement along the sleeve while enabling freedom of rotation comprising a resiliently and radially expandable and contractible ring, such as a C-type ring for example, having radially inner and outer peripheral portions confined respectively within confronting coaxial annular grooves in the outer periphery of the sleeve and an overlying inner cylindrical surface of the collar; wherein the load bearing sides of the radially resilient ring are plane surfaces normal to the axis of the spindle and closely confined between parallel sidewalls of the confronting annular grooves.

Other objects of this invention will appear in the following description and appended claims, reference being had to the accompanying drawings forming a part of this specification wherein like reference characters designate corresponding parts in the several views.

THE PRIOR ART

The following patents cited during the prosecution of my above mentioned copending application are representative of the state of the art:

| | |
|---|---|
| 2,709,600 | Lehde |
| 2,717,791 | Packer |
| 128,003 | Hebert et al (United Kingdom) |
| 102,404 | Johansson (Swedan) |

Although the above noted patents are not concerned with adaptors mountable on a conventional automotive shank spindle for adapting the same for quick-change over-spindle use, they are of general interest in representing the state of the art.

Lehde illustrates the use of an annular set of balls 20 for enabling rotational but not axial movement of a nut 16 on an adapter 7. Turning of the nut 16 moves the collet 13 into or out of the conical adapter recess. Regardless whether or not the ball-nut mechanism is suitable for the intended use described by Lehde, the patent is not in any way concerned with the provision of an adapter mountable on the spindle 5 for enabling over-spindle quick-change use without in any way modifying the spindle 5.

Packer illustrates the use of a radially expandable and contractible resilient ring 33, but is otherwise utterly unconcerned with the invention described herein.

The two foreign patents illustrate rotatable but non-axial movable mechanisms for moving a tool into and out of engagement with its driving means, but like Lehde are in no manner concerned with the provision of an adapter mountable on an automotive standard shank spindle for facilitating over-spindle tool changing without necessitating modification of the spindle itself.

Copies of brochures for Smith Tool International Corporation and BILZ Quick-Change are enclosed to illustrate prior art concerned with the problem confronted by applicant. These brochures illustrate two modifications of the above described spring activated cam and ball mechanism for releasable securing the tool holding adapter within a standard spindle without modification of the latter. However, as also noted above, the structures illustrated are in no way comparable to the present invention as claimed.

IN THE DRAWINGS

FIG. 1 is an isometric exploded view illustrating a standard automotive shank spindle and the parts mountable thereon for adapting the spindle for over-spindle quick-change usage in accordance with the present invention.

FIG. 2 is a fragmentary longitudinal mid-sectional view illustrating the sleeve and collar assembled together and in position for assembly with the spindle.

FIG. 3 is a view similar to FIG. 2, but showing the spindle adapter mounted on the spindle and a tool holder in operative position within the spindle.

DESCRIPTION OF THE INVENTION

Figure 5:
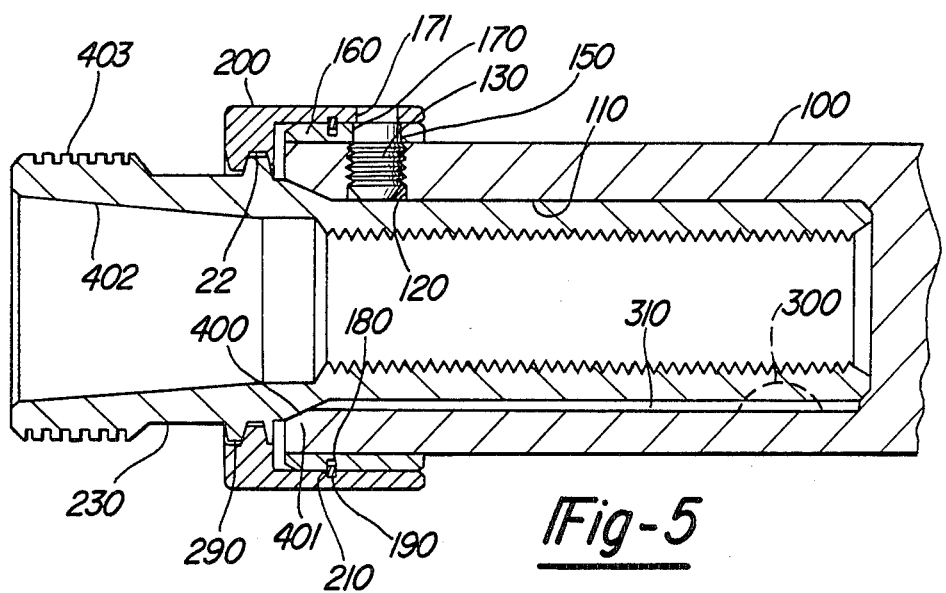
FIG. 5 is a sectional view similar to FIG. 3, illustrating a modification of the invention.

Referring to the drawings, the tool holding end of a standard automotive shank spindle 10 is illustrated having an endwise opening cylindrical recess 11 for receiving a conventional tool holder. Spaced axially from the tool holding end of the spindle 10 is a conventional screw threaded radial hole 12 customarily provided for receiving a set screw for securing a tool holder, also commonly referred to as an adapter or tool holding adapter, in an operative position within the spindle.

In accordance with the present invention, the screw hole 12 is used for receiving a special set screw 13 having an annular shoulder 14 at the radially outer end of the threaded portion and a cylindrical portion 15, of reduced diameter with respect to the threaded portion, extending coaxially from the shoulder 14. A conventional kerf or hexagonal recess may be provided in the radially outer end of the cylindrical portion 15 to receive a tool for screwing the set screw 13 into and out of the hole 12.

The outer surface of the spindle 10 adjacent to the tool holding end comprises a smooth cylindrical surface on which a sleeve 16 of annular section is closely fitted and secured in position against rotational or axial movement by means of the cylindrical set screw portion 15 closely fitting within a radial hole 17 of the sleeve 16. Before mounting the sleeve 16 on the spindle 10, the set screw 13 is screwed into the hole 12 until its radially outer portion 15 is below the outer circumference of the spindle 10, FIG. 2. Thereafter the sleeve 16 is slid coaxially over the tool holding end of the spindle 10 until the holes 12 and 17 are aligned. The screw 13 is then unscrewed within the hole 12 until the shoulder 14 abuts the inner periphery of the sleeve 16, FIG. 3.

In the above regard, the diameter of the hole 17 closely confines the cylindrical screw end 15 which extends radially a little less than the thickness of the sleeve 16 so as not to protrude beyond the latter's outer surface. The screw 13 is also dimensioned so that at the position illustrated in FIG. 3, the radially inner end of the threaded portion will not contact a tool holder assembled within the recess 11, as described below. The screw 13 may be coated with a conventional nonhardening locking cement to prevent unwanted rotation of the screw 13 within the hole 12 and to provide additional means for effectively sealing the aligned holes 12, 17 to prevent entry of grinding fines into the recess 11.

Figure 4:
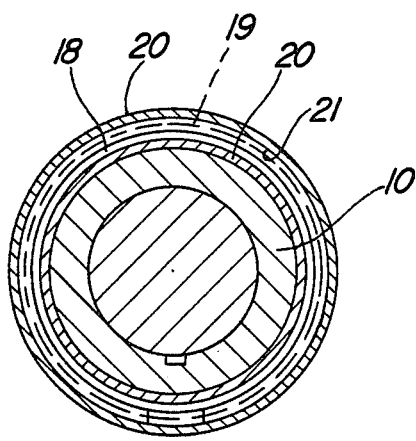
FIG. 4 is a sectional view taken in the direction of the arrows substantially along the line 4—4 of FIG. 3.

The sleeve 16 is provided adjacent its leftward end, FIG. 3 with an annular radially outward opening groove 18, FIG. 4, adapted to receive a radially resilient and deformable retaining ring 19, which may comprise a conventional multiple spiral flat sided ring, or a C-ring as illustrated. Extending coaxially around the sleeve 16 is a rotatable collar 20 having an annular radially inwardly opening groove 21 confronting the groove 18 and closely confining an outer circumferential portion of the ring 19. The axially spaced sides of the ring 19 lie in planes perpendicular to the axis of the spindle 10 and are closely confined between parallel side walls of the groves 18 and 21.

In order to facilitate assembly of the ring 19 within the confronting grooves 18 and 21, the forward or leftward radially outer edge of the sleeve 16 is chamfered at 16a. Prior to assembly of the collar 20 on the sleeve 16, the ring 19 is resiliently expanded radially, so as to extend around the circumference of the sleeve 16, and is then slid rightward over the chamfered left end of the sleeve 16 until it snaps resiliently into the groove 18.

As illustrated in FIG. 4, the depth of the groove 18 enables contraction of the ring 19 into the groove 18 sufficiently so that the outer circumference of the ring 19 will be flush with the outer surface of sleeve 16. While the ring 19 is thus compressed within the groove 18, as for example by means of a suitable tool, collar 20 is sleeved rightward over the sleeve 16 and compressed ring 19 until the groove 21 overlies and enables the ring 19 to snap resiliently to the position illustrated in FIG. 4. Assembly of the collar 20 on the sleeve 16 and over the compressed ring 19 is facilitated by an annular chamfer 20a at the inner rightward edge of collar 20. The left end of the collar 20 extends beyond the tool holding end of the spindle 10 and is internally threaded at 22.

The adapter 23 for holding a cutting tool may be conventional and comprises a generally cylindrical member externally threaded at 24 throughout approximately half of its axial length. An annular locating nut 25, internally threaded at 26, is screwed on the threaded portion 24 to a selected axial position to predetermine the axial position of a tool held by the holder 23 when assembled with the spindle 10 as described below. Nut 25 is secured in its adjusted position by means of a brass set screw 27 screwed through a threaded opening 28 tightly against the threaded portion 24. The brass screw 27 will seat against the hardened steel threads 24 and lock the nut 25 in its adjusted position without damaging the threads 24.

The outer periphery of the nut 25 is externally threaded at 29 to mate with the collar threads 22. As illustrated in FIG. 3, the screw 27 is dimensioned so that when screwed tightly into the hole 28 against the threads 24, its outer end will lie radially inwardly of the threaded portion 29 and will not interfere with the threaded engagement 22, 29.

The threaded portions 22 and 29 are also predetermined so that rotation of the collar 20 in the direction for drawing the nut 25 and holder 23 rightward to the operative position will be opposite the direction of power rotation of the spindle 10. Thus power rotation of the spindle 10 will tend to tighten the seal between the nut 25 and left end of the spindle 10. Rotation of the collar 20 in the opposite direction to move the adapter 23 axially leftward from the spindle 10, FIG. 3 may ordinarily be accomplished by finger rotation, but a pair of diametrically opposed flats 20b may be provided on the exterior surface of the collar 20 for engagement by a tool to turn the collar and forcibly extract the holder 23 from the spindle 10. Accordingly, even in the event that grinding fines work their way into recess 11, the adapter or tool holder 23 can be readily loosened from the spindle 10 by reason of the leverage provided by the acme threads 22 and 29.

In operation of the device described thus far, the nut 25 is adjustably located on the threads 24 and secured by the set screw 27 as described. Thereafter the unthreaded end of the holder 23 is inserted into the recess 11 until the threads 29 engage the threads 22. Collar 20 is then rotated to draw the nut 25 and attached tool holder 23 rightward into the spindle 10 until the nut 25 tightly engages the left end of the spindle 10 in sealing engagement. The confronting faces of the nut 25 and left end of the spindle 10 have coextensive plane surfaces normal to the axis of the spindle and thus effectively seal the recess 11 from debris such as oil and grinding fines. The threads 22 and 29 are preferably coarse acme threads that effect tightening of the nut 25 into sealing engagement with the spindle end 10 by one or two turns of the collar 20 after the threads 22 first engage the threads 29.

Although the adapter tool holder 23 may be conventional, it may be one of several different types, depending upon the tool to be held by it. In the present instance, the holder 23, by way of example, is provided with a conventional woodruff spline key 30 that slides along an axially extending keyway 31 formed in the recess 11, whereby the holder 23 is rotatable as a unit with the spindle 10. Also as is conventional, the holder 23 is provided with a conically tapered recess 32 for receiving a conventional and similarly tapered tool holding collet which may be inserted coaxially into the recess 32 and splined conventionally within an out-of-round spline recess 39.

By the foregoing, I have described a novel sleeve 16 and collar 20 assembly for adapting a standard automotive shank spindle 10 for over-spindle detachable quick-change coupling with a conventional tool holding adapter 23. The customary set screw hole 12 of the spindle 10 is used without change with a special set screw 13 for securing the sleeve 16 on the spindle 10. The customary internally threaded locating nut that conventionally screws on the adapter 23 is replaced by a similarly internally threaded nut 25 that screws on the adapter 23 (without change) for the same purpose as the conventional nut and in addition is externally threaded at 29 for screw engagement with the collar threads 22, whereby the nut 25 is drawn tightly into sealing engagement with the tool holding end of the spindle 10 simultaneously with drawing the adapter 23 into its operative position within the spindle recess 11.

The concept of the present invention is not necessarily confined to use with a standard shaft spindle and may also be readily adapted for use with modified shank spindles or adapters. FIG. 5 illustrates such a modification of the present invention wherein the various parts corresponding to the above described parts of FIGS. 1–4 are identified correspondingly by numbers increased by a factor of ten. The spindle 100 is illustrated with a modified adapter or tool holder 230 confined coaxially within the spindle recess 110 and conventionally keyed therein by a woodruff key 300 confined within the spline groove 310 of the spindle. The spindle 100 is provided with the radial set screw hole 120 for set screw 130 having the coaxial reduced diameter cylindrical outer portion 150 snugly confined within the radial hole 170 of the sleeve 160.

In FIG. 5, the set screw 130 and threaded hole 120 therefore are located more closely to the left tool holding end of the spindle 100, so as to underlie the collar 200. Accordingly the latter is provided with a radial hole 171 adapted to be aligned coaxially with the hole 170 to permit access to the screw end 150 for screwing the screw 130 within the aligned holes 120 and 170. The collar 200 is rotatable on the sleeve 160 and confined thereon against axial movement by means of the resilient radially deformable ring 190 confined within confronting grooves 180 and 210 in the sleeve 160 and collar 200 respectively as described in regard to the ring 19 within the grooves 18 and 21 in the sleeve 16 and collar 20. The forward or leftward end of the collar 200 is internally threaded at 220 for engagement with an externally threaded portion 290 of the adapter 230.

The parts mentioned thus far operate the same as their counterparts described in more detail with reference to FIGS. 1–4. In FIG. 5, the tool holding end of the spindle 100 is provided with a conically tapered opening 400 into the recess 110 for mating with a correspondingly tapered external portion 401 of the adapter 230. Also in FIG. 5, the externally threaded portion 290 comprises a unitary structure with the adapter 230, such that the above described annular nut 25 is eliminated. The adapter 230 provides conventional means for securing a tool holding collet including a coaxial inwardly converging conical recess 402 and an externally threaded portion 403 for a collet confining nut, not shown. The precise means for securing a tool or collet within the adapter 230 form no part of the present invention and are accordingly not further described.

It is apparent that the adapter 230 may be drawn into the spindle 100, or retracted therefrom, by suitably turning the collar 200. At the operative position, the tapered portions 400 and 401 of the spindle 100 and adapter 230 respectively meet in annular sealing engagement similarly to the confronting surfaces of the nut 25 and left end of the spindle 10 when the holder 23 is moved to its operative position.

I claim:

1. An over-spindle quick-change assembly for releasably securing tool holding means at an operative position with respect to a rotatable power driven shank spindle, said assembly comprising a sleeve adapted to be sleeved over one end of said spindle and having an outer cylindrical surface, means for securing said sleeve against movement with respect to said spindle, a collar having a cylindrical inner surface rotatable coaxially on said sleeve and also having a screw threaded portion for engaging screw threads of a tool holding adapter means and moving the latter to and from an operative position with respect to said spindle, and means for securing said collar against axial movement relative to said sleeve.

2. An assembly according to claim 1, said means for securing said collar against said axial movement comprising a ring resiliently expandable and contractible radially and having radially inner and outer portions confined within confronting grooves in said cylindrical surfaces of said sleeve and said collar respectively.

3. An assembly according to claim 2, said ring having parallel axially spaced sides normal to the axis of said sleeve and closely confined between parallel sides of said grooves.

4. An assembly according to claim 2 and also including nut means of said tool holding adapter means having screw threads engagable by said threaded portion of said collar for movement thereby to and from said operative position, said nut means also having annular sealing portions for engaging said one end of said spindle in annular sealing relationship around the axis of rotation of said spindle when at said operative position.

5. An assembly according to claim 1, said sleeve also having a cylindrical inner surface and a radial hole extending through said inner and outer cylindrical surfaces, said means for securing said sleeve against movement with respect to said spindle comprising a set screw having a reduced diameter radially outer portion dimensioned for rotation within said radial hole and having a screw threaded radially inner portion for screwing into the sidewall of said spindle and dimensioned to prevent entry into said radial hole.

6. An assembly according to claim 5, said means for securing said collar against said axial movement comprising a ring resiliently expandable and contractible radially and having radially inner and outer portions confined within confronting grooves in said cylindrical surface of said sleeve and said collar respectively.

7. An assembly according to claim 6, said assembly also including nut means of said tool holding adapter means having screw threads engageable by said threaded portion of said collar for movement thereby to and from said operative position, said nut means also having annular sealing portions for engaging said one end of said spindle in annular sealing relationship around the axis of said spindle when at said operative position.

8. An assembly according to claim 1, said assembly also including nut means of said tool holding adapter means having screw threads engageable by said threaded portion of said collar for movement thereby to and from said operative position, said nut means also having annular sealing portions for engaging said one end of said spindle in annular sealing relationship around the axis of rotation of said spindle when at said operative position.

9. An over-spindle quick-change assembly for detachably securing a tool holding adapter to a power driven rotatable spindle, said assembly comprising a shank spindle having an endwise opening adapter receiving recess at one end, a sleeve adapted to be sleeved over said one end of said spindle and having a cylindrical outer surface, means for securing said sleeve against relative movement with respect to said spindle, a collar having a cylindrical inner surface rotatably mounted on said cylindrical outer surface of said sleeve, means for preventing axial movement of said collar relative to said sleeve, said collar also having a screw threaded portion for engaging screw threads of said tool holding adapter means and moving the latter to and from an operative position within said recess upon rotation of said collar.

10. An assembly according to claim 9 and also comprising nut means for said tool holding adapter means, means for securing said nut means to said adapter means for moving the latter in unison with said nut means, said nut means having screw threads engageable by said threaded portion of said collar for moving said adapter means by screw action to and from said operative position upon said rotation of said collar.

11. An assembly according to claim 10, said nut means having annular sealing portions for engaging said one end of said spindle around the endwise opening of said recess in sealing relationship.

12. An assembly according to claim 11, said nut means comprising an annular nut having internal screw threads for screwing on a threaded portion of said tool holding adapter means to a selected position of adjustment, means for securing said nut at said selected position, said screw threads of said nut means comprising external screw threads of said nut engageable by said threaded portion of said collar.

13. An assembly according to claim 9, said means for securing said collar against said axial movement comprising a ring resiliently expandable and contractible radially and having radially inner and outer portions confined within confronting grooves in said cylindrical surfaces of said sleeve and said collar respectively.

14. An assembly according to claim 13, said ring having parallel axially spaced sides normal to the axis of said sleeve and closely confined between parallel sides of said grooves.

15. An assembly according to claim 9, said spindle having a radial screw threaded hole for a set screw extending through its sidewall into said recess, said sleeve also having a cylindrical inner surface and a radial hole extending through said surfaces of said sleeve and of smaller diameter than the set screw hole in said spindle, said means for securing said sleeve against said movement comprising a set screw having a reduced diameter radially outer portion rotatable within said radial hole in said sleeve and having an enlarged diameter screw threaded portion screwed into said set screw hole in said spindle and dimensioned to prevent entry into said radial hole in said sleeve, said set screw being also dimensioned to screw into said spindle sufficiently to withdraw said reduced diameter radially outer portion entirely from said radial hole in said sleeve, thereby to prevent engagement between said sleeve and said radially outer portion of said set screw and to enable said sleeve to be sleeved axially over said one end of said spindle and over said threaded hole in said spindle.

16. An assembly according to claim 15, said recess extending cylindrically and coaxially into said one end of said spindle, said means for securing said collar against said axial movement comprising a ring resiliently expandable and contractible radially and having radially inner and outer portions confined within confronting grooves in said cylindrical surfaces of said sleeve and said collar respectively.

17. An assembly according to claim 16 and also comprising an annular nut having internal screw threads, for screwing on a screw threaded portion of said tool holding adapter means to a selected position of adjustment, means for securing said nut at said selected position, said nut also having external screw threads engageable by said threaded portion of said collar for moving said adapter means by screw action to and from said operative position.

18. An assembly according to claim 17, said nut and said one end of said spindle having confronting annular sealing surfaces normal to the axis of said spindle and in sealing engagement with each other around said recess when at said operative position.

19. An assembly according to claim 18, the direction of rotation of said collar for moving said adapter means to said operative position being opposite to the direction of rotation of said spindle during power operation.

20. An assembly according to claim 19, said ring having parallel axially spaced sides normal to the axis of said sleeve and closely confined between parallel sides of said grooves.

* * * * *